(12) United States Patent
Bertothy

(10) Patent No.: US 6,872,022 B2
(45) Date of Patent: Mar. 29, 2005

(54) FOOD BASTING DEVICE

(76) Inventor: Lori Renee Bertothy, 4433 E. Wildwood Dr., Phoenix, AZ (US) 85044

( * ) Notice: Subject to any disclaimer, the term of this patent is extended or adjusted under 35 U.S.C. 154(b) by 147 days.

(21) Appl. No.: 10/458,978

(22) Filed: Jun. 11, 2003

(65) Prior Publication Data
US 2004/0005187 A1 Jan. 8, 2004

Related U.S. Application Data

(63) Continuation of application No. 10/078,768, filed on Feb. 19, 2002, now Pat. No. 6,575,651.

(51) Int. Cl.7 .............................................. A46B 11/04
(52) U.S. Cl. ...................................... 401/281; 401/280
(58) Field of Search ................................ 401/268, 270, 401/280, 281; D4/114, 116, 121

(56) References Cited

U.S. PATENT DOCUMENTS

| | | | |
|---|---|---|---|
| 2,064,318 A | 12/1936 | Platt | 15/133 |
| 2,702,396 A | * 2/1955 | Straszer | 401/281 |
| 2,736,914 A | * 3/1956 | Ratliff | 401/281 |
| D215,416 S | 9/1969 | Posada | D9/2 |
| 5,547,303 A | 8/1996 | Pyrozyk | 401/270 |
| D376,479 S | 12/1996 | Bresler | D4/114 |
| D385,704 S | 11/1997 | Williams | D4/116 |
| D400,358 S | 11/1998 | Zemel | D4/114 |
| 6,036,389 A | 3/2000 | Zima | 401/137 |

* cited by examiner

Primary Examiner—David J. Walczak
(74) Attorney, Agent, or Firm—The Halvorson Law Firm

(57) ABSTRACT

A device for basting food products in the cooking process. More specifically, the device provides variable fluid flow capabilities to food product basting appliances. The food basting device comprises two separate pieces, a cap piece and a brush piece that work in rotating relationship with each other to prove variable fluid flow through the device. The food basting device preferably works with fluid containers that do not have screw threads for a cap or lid, such as a beer or soda can.

2 Claims, 7 Drawing Sheets

FOOD BASTING DEVICE

This application is a continuation U.S. patent application, Ser. No. 10/078,768 and filed on Feb. 19, 2002 now U.S. Pat. No. 6,575,651.

FIELD OF THE INVENTION

The present invention relates to a device for dispensing liquids from a typical can, such as beer. More specifically, the present invention is a device with a can attachment piece and fluid dispensing piece that attaches to the can attachment piece and works in concert with the can attachment piece to provide adjustability of fluid flow through the device to targeted meat products.

BACKGROUND

When cooking meats and similar food items, a person often applies basting fluids such as marinades, sauces and the like, in order to enhance the flavor of the food items. Additionally, the addition of basting fluids has been found helpful in preventing the food items from excessive drying during the cooking process. During the application of the basting fluid, it is often desirable to evenly distribute the fluid of the exterior surface of the food product. This ensures an even coating of the basting fluid on the food surface.

Typically, when applying basting fluids, the fluid is applied from a container, such as a can, jar, cup, bowl or the like. Then, the basting fluid is distributed using a separate brush, spoon, fork, or other utensil. If it is desired that the utensil be repeatedly used, once it has been used, it must be prevented from contacting unclean surfaces.

One way of providing a device for basting food products with basting fluids has been to combine a container cap with a basting brush. See for examples, U.S. Pat. Nos. 6,036,389; 5,547,303; Des. 400,358; Des. 376,479; and Des. 215,416. While these patents disclose cap/brush combinations, none of them provide an easy convenient way to control the flow of the fluid as it travels through the cap/brush combination.

In U.S. Pat. No. 6,036,389 fluid flow controlled in a simple on/off manner by opening or closing a lid that covers the dispensing opening. Thus, the '389 device lacks the ability to provide variable fluid flow.

In U.S. Pat. No. 5,547,303 fluid flow is also controlled in a simple on/off manner by longitudinal displacement of the brush head (pulling the brush head outward opens the device for fluid flow and pushing the brush head inward closes the device for fluid flow).

Other patents in the prior allow continuous flow of fluids through their devices, without even simple on/off control.

Thus, there is a present need for a food product basting device that allows for variable flow control of fluids being dispensed therewith.

SUMMARY OF THE INVENTION

It is an object of the present invention to provide a food basting device that has variable fluid flow control.

It is another object of the present invention to provide a food basting device that has variable fluid flow control and further includes a brush element to evenly spread dispensed fluids onto food products.

It is yet another object of the present invention to provide a variable flow food basting device that comprises two separate pieces, the two separate pieces working together to provide the variable fluid flow capability.

It is still yet another object of the present invention to provide a variable flow food basting device works with containers that do not have screw threads for securing a cap.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF PREFERRED EMBODIMENTS

The present invention is a device that is useful for basting food products in the cooking process. More specifically, the present invention is a device that is useful by providing variable fluid flow capabilities to food product basting appliances.

Figure 1:
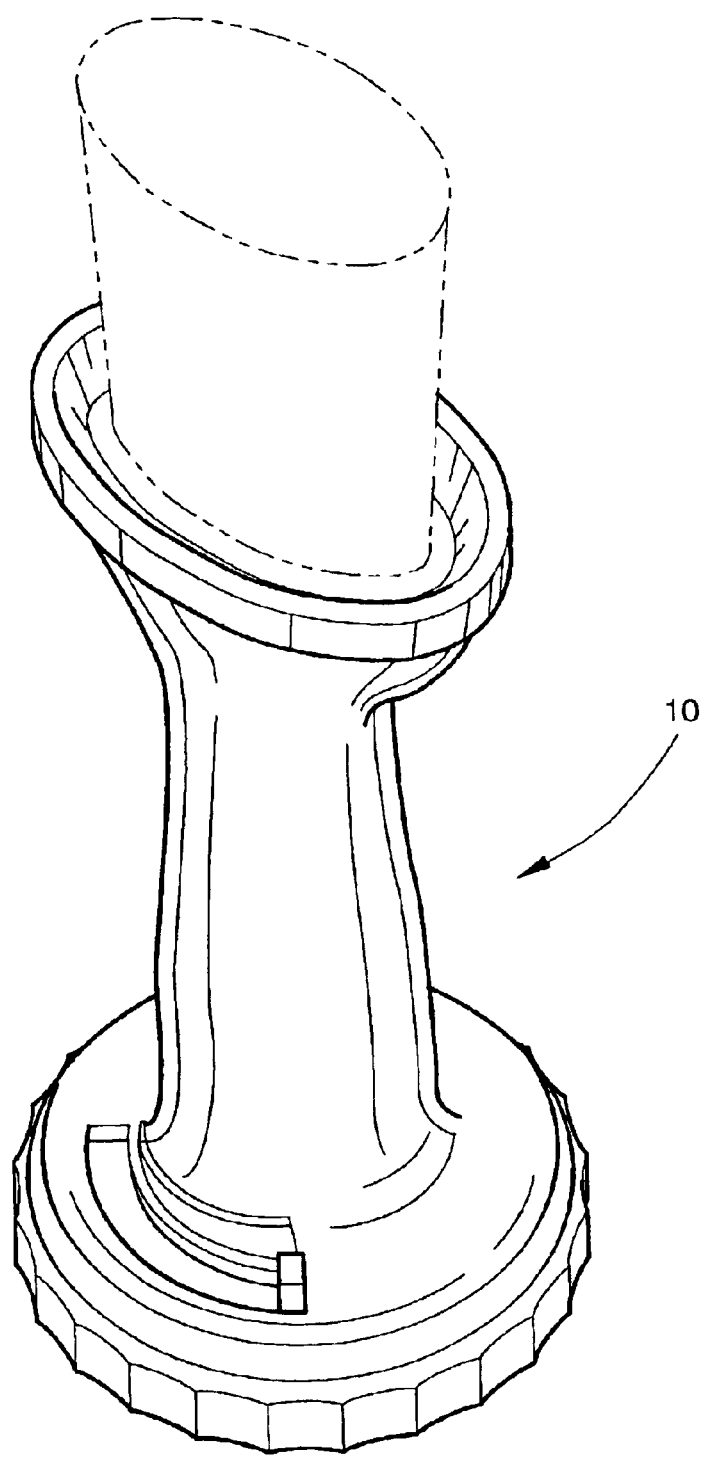
FIG. 1 is a perspective view of the present invention.
Figure 2:
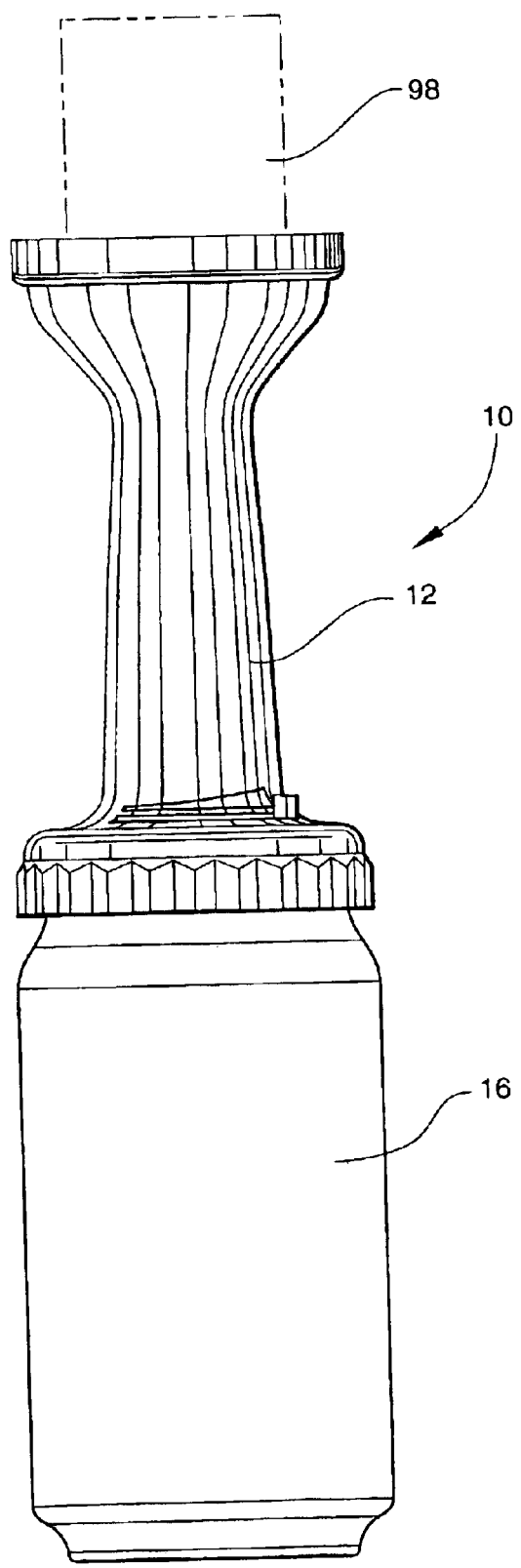
FIG. 2 is a front view of the present invention.
Figure 3:
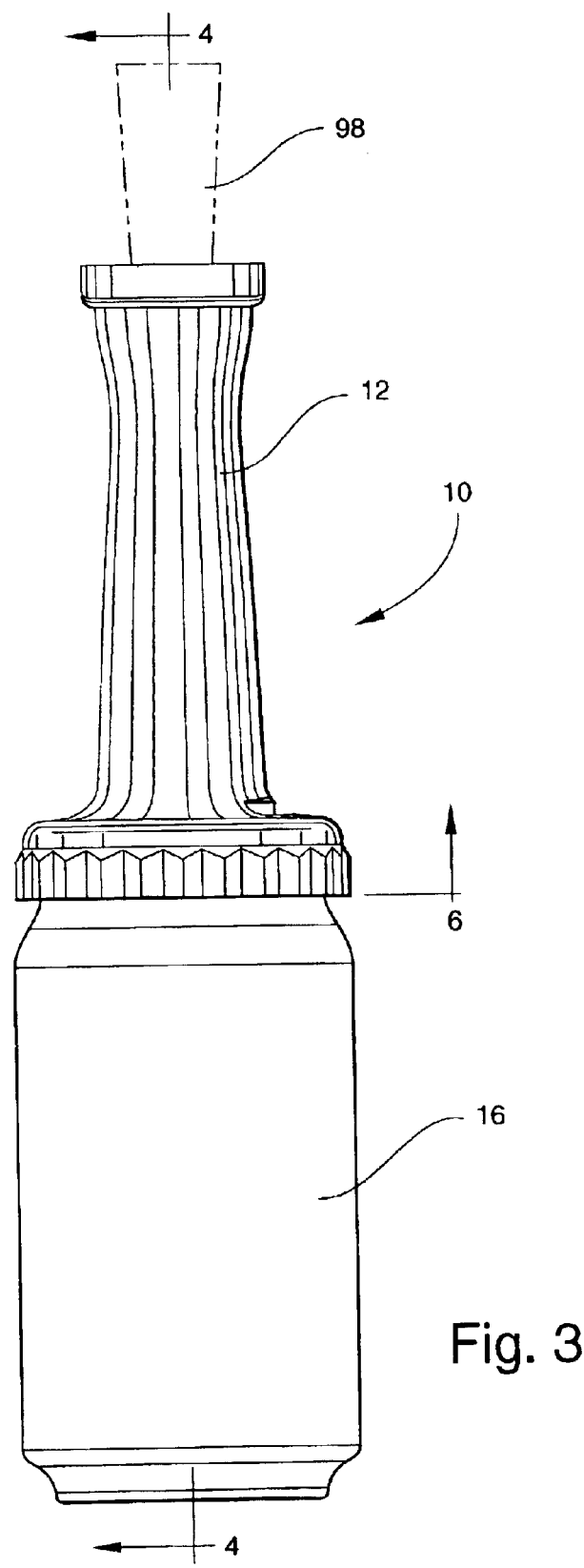
FIG. 3 is a side view of the present invention.
Figure 4:
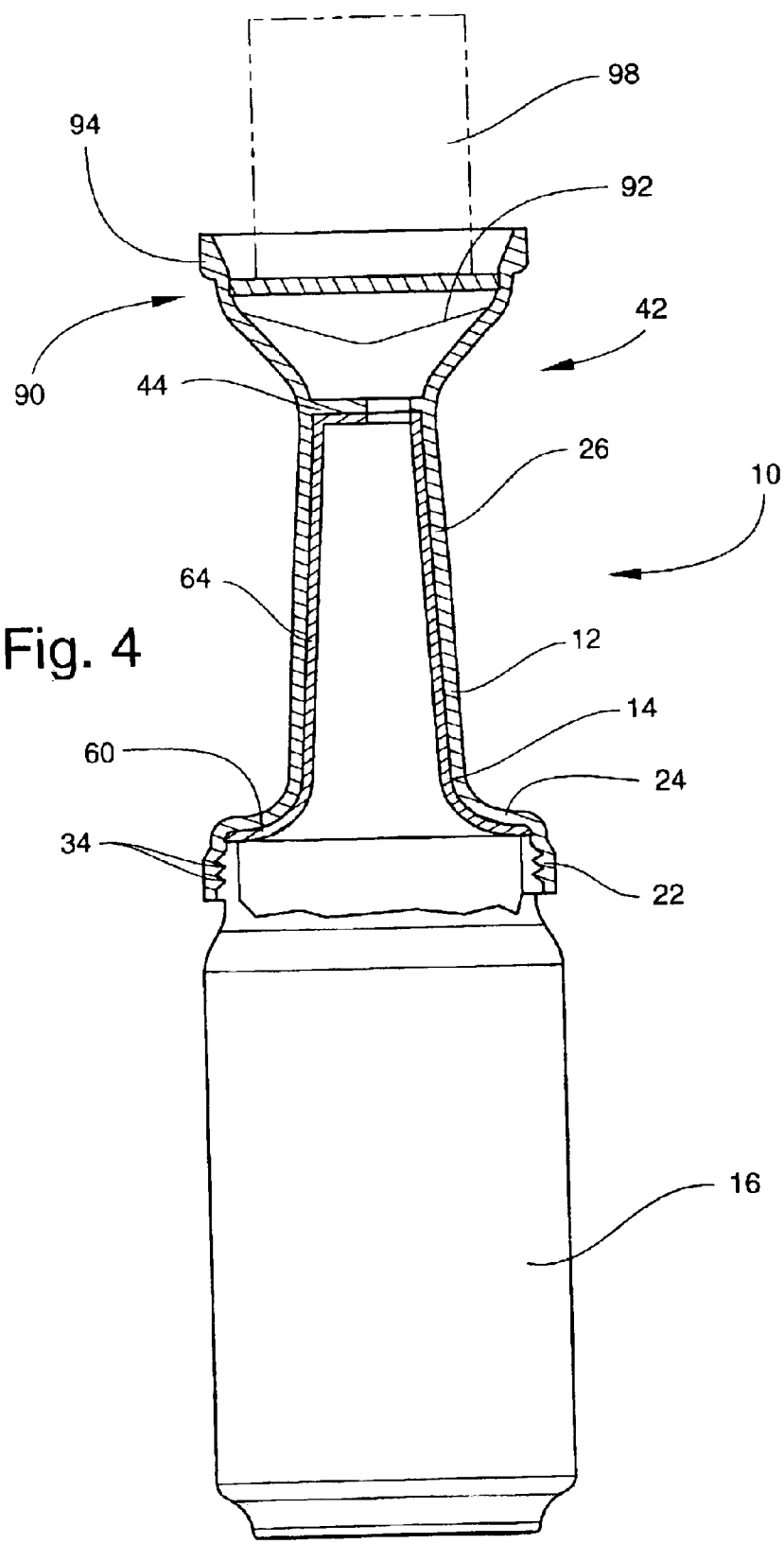
FIG. 4 is a sectional view of the present invention along lines 4—4 in FIG. 3.
Figure 5:
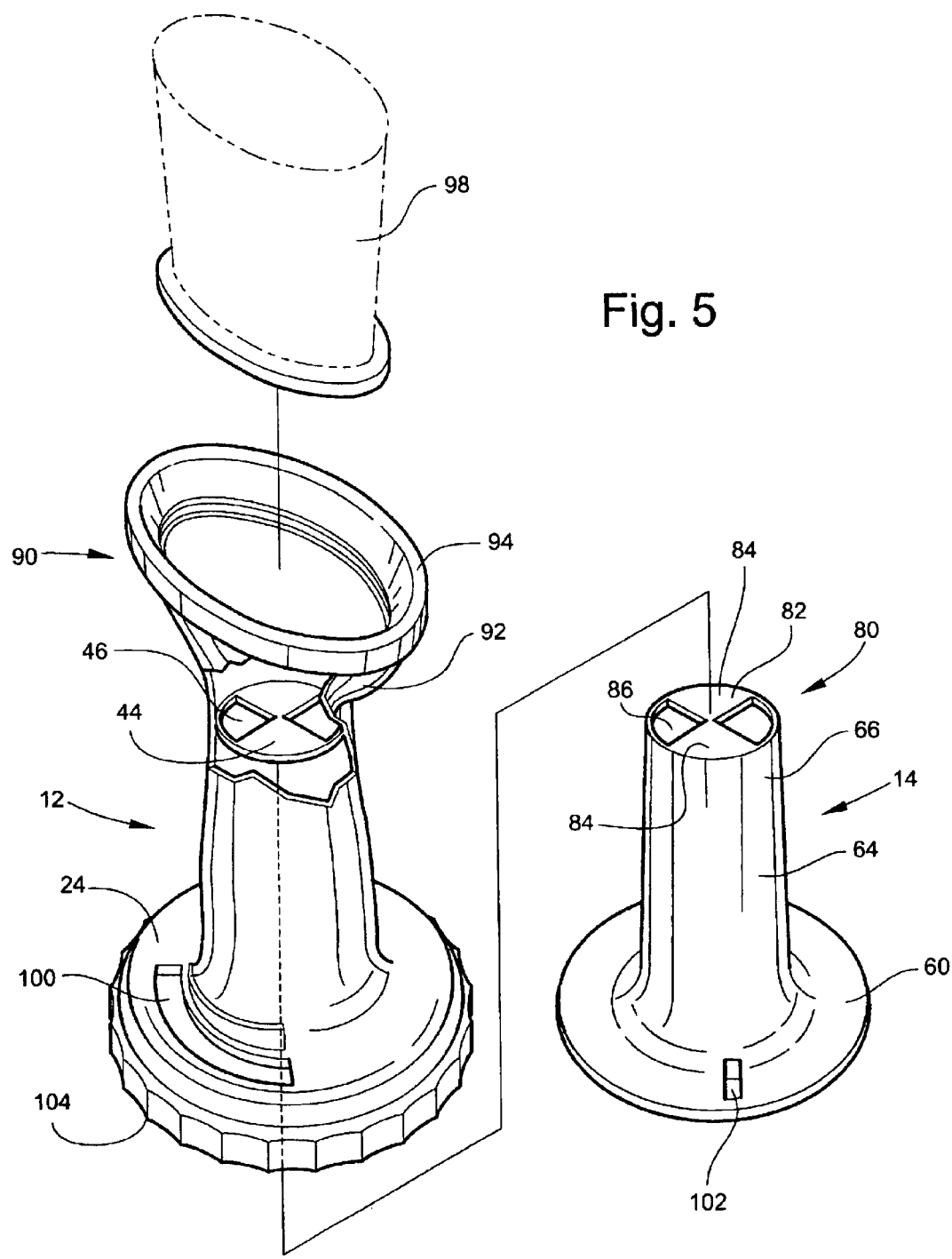
FIG. 5 is an exploded view of the present invention.
Figure 6:
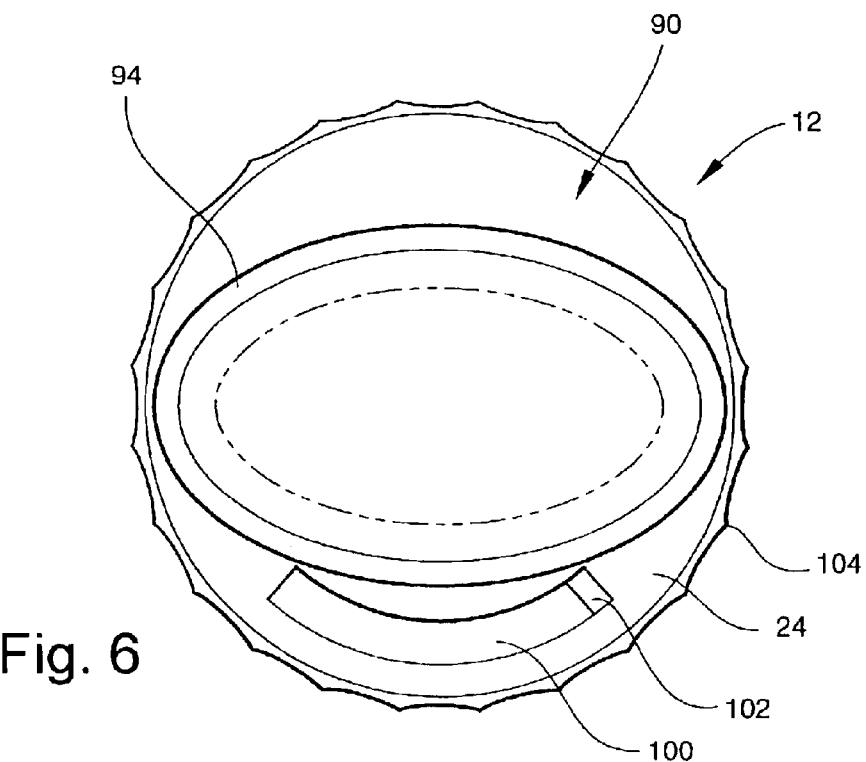
FIG. 6 is a top view of the present invention.
Figure 7:
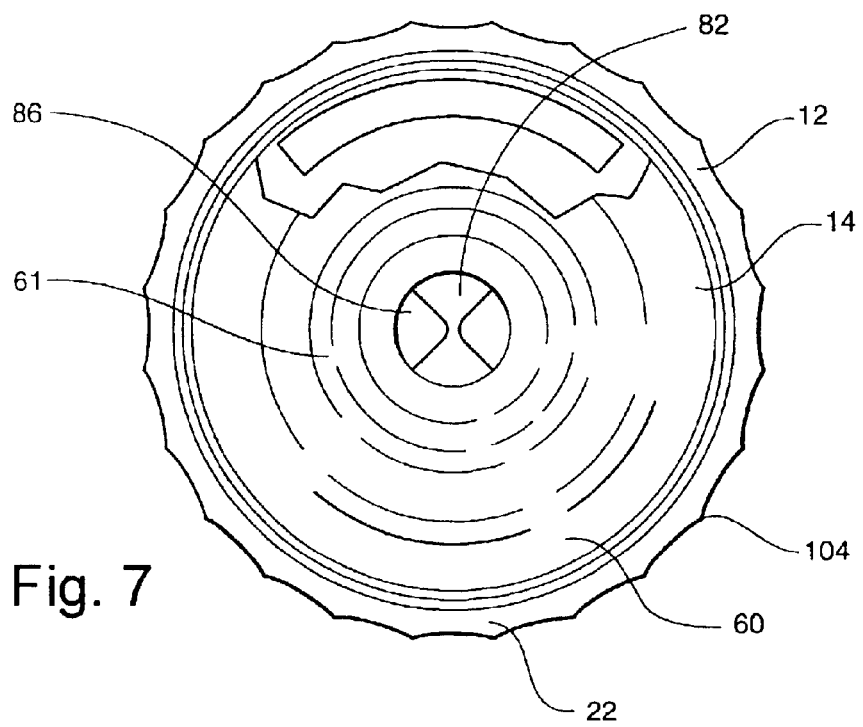
FIG. 7 is a top view of the present invention.
Figure 8:
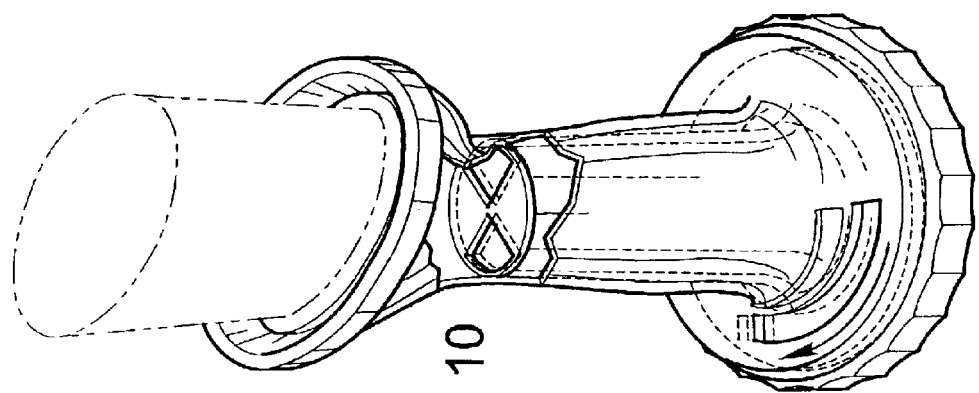
FIGS. 8–10 illustrate three different positions (open, intermediate, and closed) when using the present invention.

Referring now to FIGS. 1–7, the present invention is a food basting device and is generally represented as 10. The food basting device 10 comprises two primary pieces, a brush piece 12 and a flow regulating piece 14 (the brush may be either integrally molded onto the brush piece 12 or separately attached as illustrated in FIG. 5).

The brush piece 12 of the present invention is designed to work in combination with a fluid container 16. The preferred form of fluid container 16 would be one without screw threading for caps and lids. The most preferred form is a beverage type container, such as a beer or soda type container.

The brush piece 12 comprises a cylindrical portion 22 with a circular disk portion 24 that forms a top for the cylindrical portion 22. Centrally located in the circular disk portion 24 is a hollow fluid flow conduit 26. The hollow fluid flow conduit 26 allows a fluid that is contained in the fluid container 16 to flow through the brush piece 12 when the brush piece 12 is attached to the fluid container 16.

The interior of the cylindrical portion 22 further comprises an interior wall that runs around the interior circumference of the cylindrical portion 22. Located at a distal end of the cylindrical portion 22 is at least one, preferably two, fluid container retention ridges 34. When there are more than one fluid container retention ridges 34, each will have a different diameter than the other, thereby providing the ability to attach the brush piece 12 to different sized containers. Thus, the present invention is not limited to use with a single sized container.

The fluid flow conduit 26 further comprises a top portion 42. The top portion 42 comprises a cap 44 that contains a least one flow aperture 46, or opening, through which fluid may exit the brush piece 12. In a preferred embodiment, there are two flow apertures 46, however more than two may be used and still fall within the scope of the present invention. Preferentially, the two or more flow apertures 46 are evenly spaced about the cap 44 and wedge shaped. Thus, when there are two, they are opposite each other (180°), when there are three, they form an equilateral triangle (120°), and so forth.

Additionally, the top portion 42 of the brush piece 12 may include a brush portion 90. The brush portion 90 comprises a cup 92 with a rim 94. In a preferred form, the brush portion 90 is oval in shape, however, alternate shapes, such as circular, triangular, square, rectangular, and the like, are also considered to fall within the scope of the present invention. Necessarily, attached to the brush portion 90 are brush bristles 98 that smoothly direct the flow of fluid from the present invention onto meat, or other foods, to be basted.

Finally, referring to the figures, the outer surface of the second cylindrical section 22 of the brush piece 14 may further comprise texturing 104 such as knurling, wavey patterning, or the like.

The flow regulating piece 14 comprises a circular disk portion 60. Centrally located in the circular disk portion 60 is a hollow fluid flow conduit receiving conduit 64. An outer surface 66 of the conduit 64 is sized to snuggly fit adjacent the fluid flow conduit 26 of the brush piece 12, when the brush piece 12 is attached to the flow regulating piece 14. The distal end of the conduit 64 further comprises a top portion 80. The top portion 80 comprises a terminal cap 82 with at least one flow aperture 86.

In order to facilitate reproducibility of the variable flow control, the brush piece 12 further may comprise a flow control window 100 that allows the user to variably adjust fluid flow. A register tab 102 is included on the top surface of the circular disk portion 60 of the flow regulating piece 14, said register tab 102 sized to fit within the window 100 and serves to limit the movement of the brush piece 14 to the angle defined by the window 100. That is, the register tab 102 is located at one side of the window 100 when the device is in a closed position and at the other side of the window 100 when the device is in a fully opened position.

Figure 9:
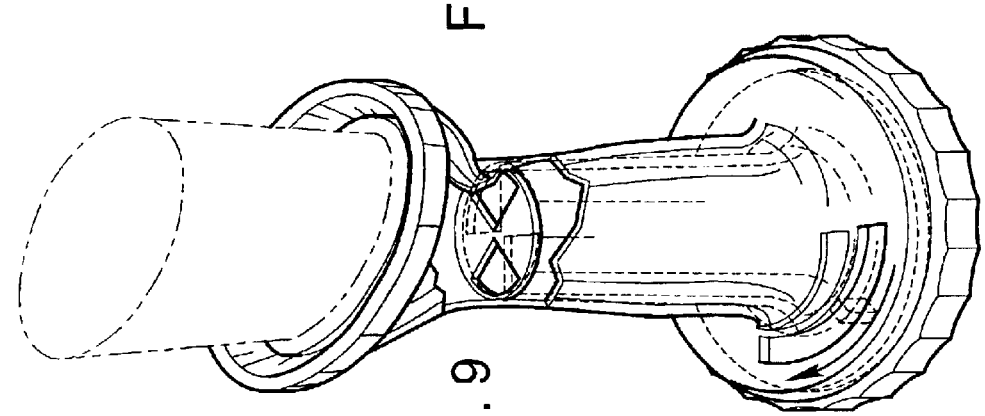
Figure 10:
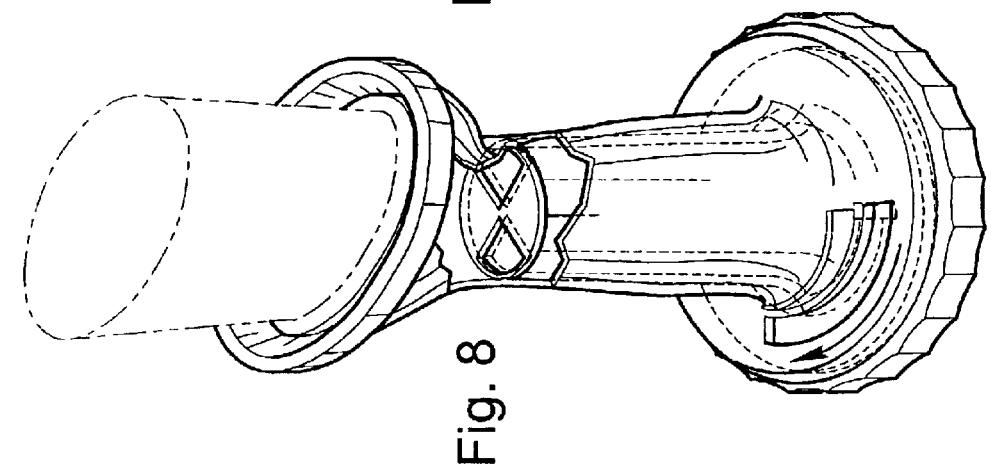

In operation, and referring to FIGS. 5 and 8–10, the flow regulating piece 14 may be rotated relative to the brush piece 12 around a common axis. There is a fully closed position (FIG. 10 or alternately FIG. 8) where flow control tabs 84 totally occlude the gaps (and the bisected aperture 86) between the flow control tabs 84 and the flow apertures 46. There is a fully open position (FIG. 8 or alternately FIG. 10) where the flow control tabs 84 are rotated to a position behind the cap 44 thereby leaving the gaps unblocked. Additionally, and importantly, the design of the present invention allows for fully variable fluid flow. This is accomplished by rotating the flow control tabs 84 into one of the potentially infinite intermediate positions between the fully open position and the fully closed position (FIG. 9).

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A device for basting food products comprising a brush piece moveably fitted onto a flow regulating piece, the brush piece comprises a cylindrical portion with a circular disk portion that forms a top for the cylindrical portion of the brush piece, centrally located in the circular disk portion of the brush piece is a hollow fluid flow conduit, located at a distal end of the hollow fluid flow conduit is a cap with at least one flow aperture and brush portion comprising a cup with a rim and attached bristles, and the brush piece further includes a flow control window located in the circular disk portion of the brush piece; the flow regulating piece comprises a circular disk portion and centrally located in the circular disk portion of the flow regulating piece is a hollow fluid flow receiving conduit with a cap at a distal end having at least one aperture, further there is a register tab on a top surface of the circular disk portion of the flow regulating piece that fits within the flow control window to limit the rotation of the flow regulating piece relative to the brush piece, wherein the flow regulating piece is rotatably mounted in the brush piece to adjust the fluid flow from the fluid container.

2. The device according to claim 1 wherein there are two flow apertures in the cap on the brush piece and two apertures in the cap on the flow regulating piece.

* * * * *